(12) United States Patent
Bar Shalom et al.

(10) Patent No.: US 11,736,209 B1
(45) Date of Patent: Aug. 22, 2023

(54) ANTENNA ARRAY SYSTEM WITH DIRECTIONAL COUPLERS FOR CALIBRATION

(71) Applicant: GM GLOBAL TECHNOLOGY OPERATIONS LLC, Detroit, MI (US)

(72) Inventors: Ofer Bar Shalom, Kiryat Ono (IL); Igal Kotzer, Tel Aviv (IL); Ofer Givati, Hertzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 17/701,750

(22) Filed: Mar. 23, 2022

(51) Int. Cl.
*H04B 17/00* (2015.01)
*H04B 17/21* (2015.01)
*H01Q 3/26* (2006.01)

(52) U.S. Cl.
CPC .............. *H04B 17/21* (2015.01); *H01Q 3/267* (2013.01)

(58) Field of Classification Search
CPC ...... H04B 17/24; H04B 17/22; H04B 17/221; H04B 17/294; H04Q 3/267; H04Q 3/30; H04Q 21/00
See application file for complete search history.

(56) References Cited

U.S. PATENT DOCUMENTS

| | | | |
|---|---|---|---|
| 6,385,435 B1 * | 5/2002 | Lee | H04B 7/15585 455/24 |
| 9,800,284 B2 * | 10/2017 | Papadopoulos | H04B 1/40 |
| 2012/0027066 A1 * | 2/2012 | O'Keeffe | H01Q 3/267 375/224 |

OTHER PUBLICATIONS

Steven Kay, "A Fast and Accurate Single Frequency Estimator", IEEE Transactions of Acoustics, Speech, and Signal Processing, vol. 37, No. 12, Dec. 1989, pp. 1987-1990.

David C. Rife and Robert R. Boorstyn, Single-Tone Parameter Estimation from Discrete-Time Observations, IEEE Transactions on Information Theory, vol. IT-20, No. 5, Sep. 1974, pp. 591-598.

* cited by examiner

*Primary Examiner* — Tuan Pham
(74) *Attorney, Agent, or Firm* — Quinn IP Law

(57) ABSTRACT

An antenna array system includes a receiver with a plurality of receiving chains adapted to receive incoming signals from corresponding receiver antennas. A respective directional coupler is positioned in proximity to each of the plurality of receiving chains. The plurality of receiving chains is adapted to receive a respective pilot signal through the respective directional coupler, the respective pilot signal being transmitted simultaneously. A controller has a processor and tangible, non-transitory memory on which instructions are recorded for a method of calibration. One of the plurality of receiving chains is selected as a reference channel. The controller is adapted to perform calibration for the plurality of receiving chains based on the respective pilot signal, including obtaining respective chain phase values and respective gain factors. The calibration is performed without mechanical switching off or physically disconnecting the corresponding receiver antennas.

19 Claims, 3 Drawing Sheets

ANTENNA ARRAY SYSTEM WITH DIRECTIONAL COUPLERS FOR CALIBRATION

INTRODUCTION

The present disclosure relates generally to antenna calibration. More specifically, the disclosure relates to an antenna array system having directional couplers to enable instantaneous calibration. In antenna systems with two or more antennas, there may be differences in the propagation pathways that affect the amplitude and phase of the signals being transmitted and received with these antennas. These differences may be accounted for by determining calibration offsets, which are typically determined before the antenna system has been installed. Environmental factors may cause the differences between the antennas to further change, after the antenna system has been installed.

SUMMARY

Disclosed herein is an antenna array system with a receiver having a plurality of receiving chains. A respective directional coupler is positioned in proximity to each of the plurality of receiving chains. A controller has a processor and tangible, non-transitory memory on which instructions are recorded for a method of calibration. One of the plurality of receiving chains is selected as a reference channel. The controller is adapted to perform calibration for the plurality of receiving chains based on the respective pilot signal, including obtaining respective chain phase values and respective gain factors. The calibration is performed without mechanical switching off or physically disconnecting the corresponding receiver antennas.

The respective pilot signal may be a continuous wave. Each of the corresponding receiver antennas may be passive antennas. The signals may originate from a remote transmitter. The pilot bandwidth of the respective pilot signal is selected such that the respective pilot signal is within a received bandwidth of the receiver and outside a transmit bandwidth of the remote transmitter.

In some embodiments, performing the calibration includes determining a respective estimated signal for the plurality of receiving chains based in part on the respective chain phase values, the respective chain phase values being obtained with a predetermined estimator. The respective estimated signal of an mth chain of the plurality of receiving chains at time-step $t_k$ is obtained as:

$$s_m(t_k) = A_m e^{j(2\pi F1 t_k + \varphi_m)} + n_m(t_k), k = 0, \ldots, N-1$$

and wherein $A_m$ is a signal amplitude of the mth chain, F1 is a center frequency of the respective pilot signal, $\varphi_m$ is a phase value of the mth chain, N is a number of time-steps and $n_m(t_k)$ is a noise function at the time-step $t_k$.

In some embodiments, performing the calibration includes de-rotating the respective estimated signal with a rotation matrix, the rotation matrix being a function of a phase value $\varphi_1$ of the reference channel and a phase value $\varphi_m$ of the mth chain of the plurality of receiving chains. The rotation matrix for the mth chain is represented as:

$$\begin{bmatrix} \cos(\varphi_1 - \varphi_m) & -\sin(\varphi_1 - \varphi_m) \\ \sin(\varphi_1 - \varphi_m) & \cos(\varphi_1 - \varphi_m) \end{bmatrix}.$$

Disclosed herein is a method of calibrating an antenna array system having a receiver with a plurality of receiving chains and a controller with a processor and tangible, non-transitory memory. The method includes adapting the plurality of receiving chains to receive signals from corresponding receiver antennas. A respective directional coupler is positioned in proximity to each of the plurality of receiving chains. The method includes introducing a respective pilot signal to the plurality of receiving chains through the respective directional coupler, the respective pilot signal being transmitted simultaneously. One of the plurality of receiving chains is selected as a reference channel, via the controller. The method includes performing calibration for the plurality of receiving chains based on the respective pilot signal, via the controller, including obtaining respective chain phase values and respective gain factors.

The above features and advantages and other features and advantages of the present disclosure are readily apparent from the following detailed description of the best modes for carrying out the disclosure when taken in connection with the accompanying drawings.

Figure 1:
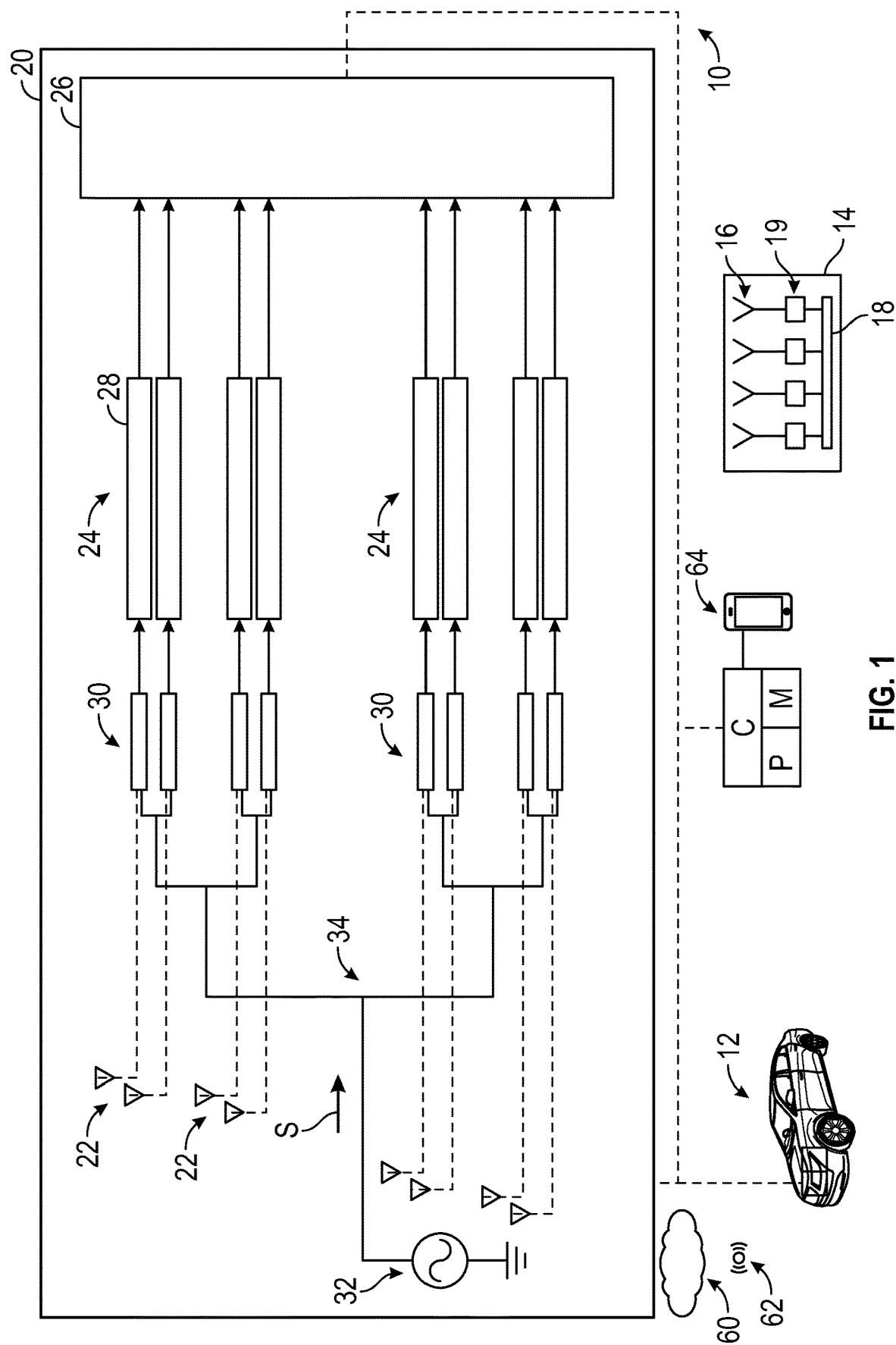
FIG. 1 is a schematic diagram of an example antenna array system having a receiver and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates an antenna array system 10, which may be attached to a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, airplane and train. Alternatively, the antenna array system 10 may be attached to a building, post or other fixture.

Referring to FIG. 1, the antenna array system 10 is adapted to capture signals generated by a remote transmitter 14 having a plurality of transmitting antennas 16 configured to transmit or direct electromagnetic waves (e.g., in a radio and/or a microwave domain) from a transmission source 18. Respective phase shifters 19 may be operatively connected to the transmitting antennas 16 and configured to shift a phase of the electromagnetic waves to produce a phased-array beam. Other types of antenna systems or implementations available to those skilled in the art may be employed.

Referring to FIG. 1, the antenna array system 10 includes a receiver 20 having a plurality of receiver antennas 22 configured to receive an incoming signal (e.g., electromagnetic waves reflecting off a target) and direct them to a plurality of receiving chains 24, respectively. The incoming signal is directed for subsequent processing to a digital sampler 26, which receives a sample stream from each of the receive paths. Referring to FIG. 1, directional couplers 30 are respectively positioned in proximity to the plurality of receiving chains 24 in the receiver 20. For simplicity, eight receiver antennas 22 and receiving chains 24 are shown in FIG. 1, however, it is understood that the number of components may be varied based on the application at hand.

In the embodiment shown, the plurality of receiver antennas 22 are passive antennas. A passive antenna is a radiating element composed entirely of passive components, with no active components for electrical enhancement (e.g., transistors, amplifiers). Referring to FIG. 1, the system 10 includes a controller C having at least one processor P and at least one memory M (or non-transitory, tangible computer readable storage medium) on which instructions are recorded for a method 200 for calibrating the receiver 20. Method 200 is described below with respect to FIG. 4. The memory M can store controller-executable instruction sets, and the processor P can execute the controller-executable instruction sets stored in the memory M.

Calibration may be described as a process of measuring the output signal of a specific unit/system with a reference input signal (having an expected output signal) and tuning the system parameters until the resulting output signal matches the expected output signal. To enable estimation of spatial directions (i.e., angles of arrival) as well as other parameters associated with signals impinging the receiver 20, each of the receiving chains 24 constructing the array are required to act coherently in frequency, time, phase and gain. First, time and frequency synchronization are needed (e.g., through the distribution of a single clock source) between each of the receiving chains 24. Once this occurs, the remaining challenge is to eliminate residual phase and gain imbalances between each of the receiving chains 24. This enables the coherent reception required for estimating the angles of arrival and other parameters associated with the signals striking the receiver 20.

As described below, a radiofrequency pilot tone or signal S, which is within the received bandwidth of the receiver 20 but outside the transmit bandwidth of the transmitter 14, is introduced respectively and simultaneously using the directional couplers 30 to the receiving chains 24 of the antenna array system 10. The antennas in a passive antenna array need to be manually (or electronically) disconnected first in order to wire-in a reference input signal. This cannot be done in real-time, while receiving the signal of interest in parallel. The technical advantage presented herein is that the antenna array system 10 may be calibrated instantaneously in real-time, without the need for disconnecting the receiver antennas 22.

Figure 4:
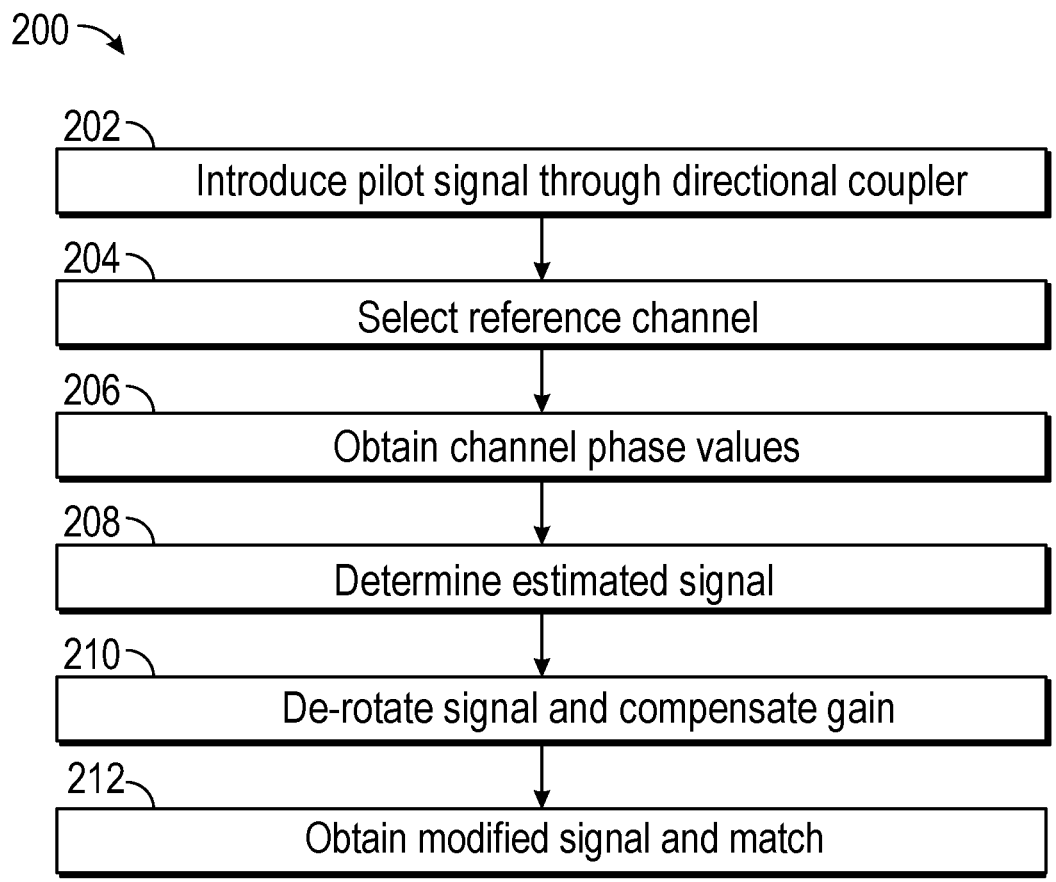
FIG. 4 is a flowchart for a method executable by the controller of FIG. 1.

Referring now to FIG. 4, an example flowchart of the method 200 is shown. Method 200 may be embodied as computer-readable code or instructions stored on and partially executable by the controller C of FIG. 1. Method 200 may be executed in real-time, continuously, systematically, sporadically and/or at regular intervals, for example, each 10 milliseconds during normal and ongoing operation of the vehicle 12. Method 200 need not be applied in the specific order recited herein. Furthermore, it is to be understood that some blocks or steps may be eliminated.

Per block 202 of FIG. 4, the method 200 includes generating a pilot signal S and selectively commanding injection of the pilot signal S into the receiving chains 24.

Referring to FIG. 1, the pilot signal may be generated using a signal generator 32, which is connected to the directional couplers 30 via circuitry 34. The signal generator 32 may be external to the antenna array system 10. In the embodiment shown, signal generator 32 is a continuous wave signal generator. In one example, the continuous wave is a sine wave. The signal type may be varied based on the application at hand.

Figure 2:
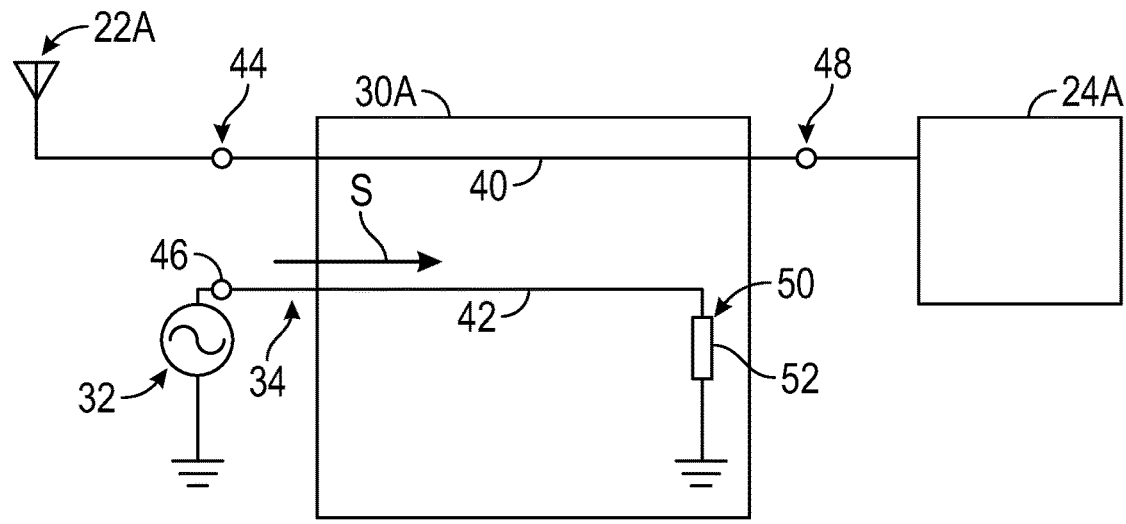
FIG. 2 is a schematic fragmentary diagram of an example receiving antenna array.

Referring to FIG. 1, the pilot signal S is directed into the receiving chains 24 through the directional couplers 30. An example configuration for a directional coupler 30A is shown in FIG. 2. It is understood that the directional couplers 30 may take many different forms and include multiple and/or alternate components and facilities. For example, the directional couplers 30 may incorporate a single, dual directional, coaxial, waveguide design or a combination of these and other designs.

The directional coupler 30A of FIG. 2 incorporates two coupled transmission lines, such as first transmission line 40 and second transmission line 42, set sufficiently close together such that the energy passing through one is coupled to the other. Referring to FIG. 2, the signal from a receiver antenna 22A enters the first transmission line 40 via input port 44. The pilot signal S from the signal generator 32 enters the second transmission line 42 via coupled port 46. The first transmission line 40 and the second transmission line 42 are sufficiently close such that the pilot signal S passes through to the receiving channel 24A via the transmitted port 48. Referring to FIG. 2, the directional coupler 30A may include an isolated port 50, which may be terminated with a matching load 52 (e.g., 50 ohms). This termination may be internal to the directional coupler 30A. The distance between the first transmission line 40 and the second transmission line 42 (affecting the efficiency of the coupling) may be varied based on the application at hand.

Figure 3:
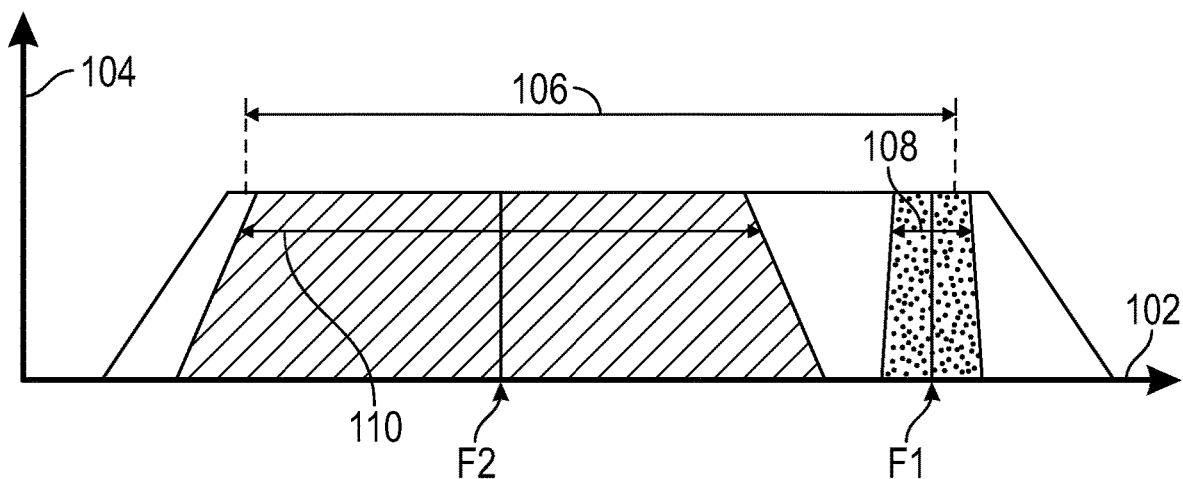
FIG. 3 is a schematic example graph showing bandwidth for the receiver of FIG. 1.

Referring now to FIG. 3, bandwidth selection for the pilot signal S is shown. The horizontal axis 102 for the graph in FIG. 3 indicates frequency while the vertical axis 104 indicates power/amplitude. The maximum receiving bandwidth 106 of the receiver 20 (see FIG. 1) is shown in FIG. 3. Referring to FIG. 3, the pilot filter bandwidth 108 (centered at first frequency F1) is selected such that it falls within the maximum receiving bandwidth 106 but is outside of the spectrum of the transmitted signal, in other words, outside a transmit bandwidth 110 (centered at second frequency F2) of the remote transmitter 14. This allows the pilot signal S to be filtered out without affecting the signal of interest, such as through hardware or software methods available to those skilled in the art. The power of the pilot signal S is selected such that it will not damage or compress integrated components within the receiving chains 24. For example, the receiving chains 24 (see FIG. 1) may include integrated internal amplifiers (e.g., low noise).

Proceeding to block 204 of FIG. 4, the method 200 includes selecting one of the receiving chains 24 as a reference channel 28 (see FIG. 1). The phase offset and gain of the remaining ones of the receiving chains 24 are estimated relative to the reference channel 28. Due to natural imbalances or asymmetries in the circuitry of the receiving chains 24, the pilot signal S undergoes different delays and attenuations. The natural imbalances in the receiving chains 24 may be a result of manufacturing imperfections, aging, temperature variation or other reasons. If the delay difference between the receiving chains 24 is shorter than one cycle of the pilot signal, it manifests as a phase offset that may be estimated relative to the phase of one of the receiving chains 24 (selected as reference channel 28) for the estimation of phase offset and channel gain.

Advancing to block 206 of FIG. 4, the controller C is programmed to obtain respective chain phase values [$\varphi_1, \ldots, \varphi_M$] using a predetermined estimator available to those skilled in the art. Some examples of estimator functions are described in, "*Single-Tone Parameter Estimation from Discrete-Time Observations,*" authors D. Rife and R. R. Boorstyn, IEEE Transactions on Information Theory, vol. IT-20, no. 5, September 1974, pp. 591-598, and, "*A Fast and Accurate Single Frequency Estimator,*" IEEE Transactions on Acoustics, Speech, and Signal Processing, author S. Kay, vol. ASSP-37, no. 12, December 1989, pp. 1987-1990.

Proceeding to block 208 of FIG. 4, the controller C is programmed to determine a respective estimated signal for the receiving chains 24 based in part on the respective chain phase values [$\varphi_1, \ldots, \varphi_M$]. When the pilot signal S is a continuous wave sine wave, the estimated signal [$s_m(t_k)$] of the mth chain in the receiving chains 24 at time-step $t_k$ (or kth sample) may be obtained as follows:

$$s_m(t_k) = A_m e^{j(2\pi F 1 t_k + \varphi_m)} + n_m(t_k), k = 0, \ldots, N-1$$

Here $A_m$ is a signal amplitude of the mth chain in the receiving chains 24, F1 is the center frequency of the pilot filter bandwidth 108, $\varphi_m$ is the phase value of the mth chain (from block 206), N is the number of samples taken or time-steps and $n_m(t_k)$ is a noise function at time-step ($t_k$). The noise function may be approximated as a Gaussian function. The estimated signal [$s_m(t_k)$] may be represented in matrix form with a real term [$\Re\{s_m(t_k)\}$] and an imaginary term [$\Im\{s_m(t_k)\}$], as follows:

$$s_m(t_k) \equiv \begin{bmatrix} \Re\{s_m(t_k)\} \\ \Im\{s_m(t_k)\} \end{bmatrix}.$$

Proceeding to block 210 of FIG. 4, the method 200 includes de-rotating the respective estimated signal for the receiving chains 24 with a rotation matrix. The rotation matrix employs an estimated phase offset for the mth chain with a complex de-rotation in order to eliminate this phase offset. The rotation matrix D may be represented as follows:

$$D = \begin{bmatrix} \cos(\varphi_1 - \varphi_m) & -\sin(\varphi_1 - \varphi_m) \\ \sin(\varphi_1 - \varphi_m) & \cos(\varphi_1 - \varphi_m) \end{bmatrix}$$

Here, $\varphi_1$ is the phase value of the reference channel 28 and $\varphi_m$ is the phase value of the mth chain (from block 206).

Also, per block 210 of FIG. 4, the controller C is programmed to apply gain compensation to the respective estimated signal for the receiving chains 24. Once the phase offset and gain imbalance between each of the receiving chains 24 and the reference channel 28 have been estimated, differences between them may be eliminated to enable coherent reception. The root-mean-squared metric of the mth chain may be used to estimate the gain factor $\hat{\alpha}_m$ for the mth chain, as shown below:

$$\hat{\alpha}_m = \sqrt{\frac{1}{N} \sum_{k=0}^{N-1} s_m^2(t_k)}$$

Here $s_m(t_k)$ is the estimated signal of the mth chain and N is the number of samples taken or time-steps.

Proceeding to block 212 of FIG. 4, the method 200 includes obtaining a modified signal. After phase de-rotation and gain-compensation, the modified signal $S_m(t_k)$ of the mth chain of the receiving chains 24 may be obtained as:

$$S_m(t_k) = \frac{\hat{\alpha}_1}{\hat{\alpha}_m} D s_m(t_k),$$

where D is the rotation matrix, $s_m(t_k)$ is the estimated signal of the mth chain and $$\frac{\hat{\alpha}_1}{\hat{\alpha}_m}$$

is the ratio of the gain factor for the reference channel 28 over the gain factor for the mth chain of the receiving chains 24. The system parameters of the receiver 20 are turned or adjusted until the actual output signal matches the expected output signal (in this case, in terms of gain and phase offset).

In some embodiments, the method 200 may be stored as a module in a remotely located or "off-board" cloud computing service, referred to herein as cloud unit 60 (shown in FIG. 1), that interfaces with the controller C. The cloud unit 60 may include one or more servers hosted on the Internet to store, manage, and process data, maintained by an organization, such as for example, a research institute or a company. The method 200 may be updateable via remote updates.

Referring to FIG. 1, the controller C may be configured to communicate with the cloud unit 60 via a wireless network 62. The wireless network 62 of FIG. 1 may be a short-range network or a long-range network. The wireless network 62 may be a communication BUS, which may be in the form of a serial Controller Area Network (CAN-BUS). The wireless network 62 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

In some embodiments, the method 200 may be triggered via a mobile application 64 (shown in FIG. 1) that is in communication with the controller C. For example, the mobile application 64 may be physically connected (e.g., wired) to the controller C as part of the vehicle infotainment unit. The mobile application 64 may be embedded in a smart phone belonging to a user of the vehicle 12 and plugged or otherwise linked to the vehicle 12. The circuitry and components of a mobile application 64 ("apps") available to those skilled in the art may be employed. The antenna array system 10 may employ beamforming at the transmitting end. For example, a pattern of constructive and destructive interference in the wavefront may be created, by controlling the phase and relative amplitude of the signal at the transmitting antennas 16.

In summary, the antenna array system 10 (via execution of the method 200) employs the use of directional couplers 30 for introducing a pilot signal S to be used for instantaneous phase and gain calibration of signal parameters. The antenna array system 10 allows the introduction of a continuous wave as the pilot signal S into the receiving chains 24, without being required to use mechanical switches or physically disconnecting the receiver antennas 22 (to connect the signal generator 32).

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 4 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An antenna array system comprising:
a receiver having a plurality of receiving chains adapted to receive signals from corresponding receiver antennas;
a respective directional coupler positioned in proximity to each of the plurality of receiving chains;
wherein the plurality of receiving chains is adapted to receive a respective pilot signal through the respective directional coupler, the respective pilot signal being transmitted simultaneously;
a controller having a processor and tangible, non-transitory memory on which instructions are recorded, the controller being adapted to select one of the plurality of receiving chains as a reference channel; and
wherein the controller is adapted to perform calibration for the plurality of receiving chains based on the respective pilot signal, including obtaining respective chain phase values and respective gain factors.

2. The antenna array system of claim 1, wherein the calibration is performed without mechanical switching off or physically disconnecting the corresponding receiver antennas.

3. The antenna array system of claim 1, wherein the respective pilot signal is a continuous wave.

4. The antenna array system of claim 1, wherein each of the corresponding receiver antennas are passive antennas.

5. The antenna array system of claim 1, wherein the signals originate from a remote transmitter
and
wherein a pilot bandwidth of the respective pilot signal is selected such that the respective pilot signal is within a received bandwidth of the receiver and outside a transmit bandwidth of the remote transmitter.

6. The antenna array system of claim 1, wherein performing the calibration includes determining a respective estimated signal for the plurality of receiving chains based in part on the respective chain phase values, the respective chain phase values being obtained with a predetermined estimator.

7. The antenna array system of claim 6, wherein the respective estimated signal of an mth chain of the plurality of receiving chains at time-step $t_k$ is obtained as:

$$s_m(t_k) = A_m e^{j(2\pi F1 t_k + \varphi_m)} + n_m(t_k), k = 0, \ldots, N-1;$$

and wherein $A_m$ is a signal amplitude of the mth chain, F1 is a center frequency of the respective pilot signal, $\varphi_m$ is a phase value of the mth chain, N is a number of time-steps and $n_m(t_k)$ is a noise function at the time-step $t_k$.

8. The antenna array system of claim 7, wherein performing the calibration includes de-rotating the respective estimated signal with a rotation matrix, the rotation matrix being a function of a phase value $\varphi_1$ of the reference channel and a phase value $\varphi_m$ of the mth chain of the plurality of receiving chains.

9. The antenna array system of claim 8, wherein the rotation matrix for the mth chain is represented as:

$$\begin{bmatrix} \cos(\varphi_1 - \varphi_m) & -\sin(\varphi_1 - \varphi_m) \\ \sin(\varphi_1 - \varphi_m) & \cos(\varphi_1 - \varphi_m) \end{bmatrix}.$$

10. A method of calibrating an antenna array system having a receiver with a plurality of receiving chains and a controller with a processor and tangible, non-transitory memory, the method comprising:
   adapting the plurality of receiving chains to receive signals from corresponding receiver antennas;
   positioning a respective directional coupler in proximity to each of the plurality of receiving chains;
   introducing a respective pilot signal to the plurality of receiving chains through the respective directional coupler, the respective pilot signal being transmitted simultaneously;
   selecting one of the plurality of receiving chains as a reference channel, via the controller; and
   performing calibration for the plurality of receiving chains based on the respective pilot signal, via the controller, including obtaining respective chain phase values and respective gain factors.

11. The method of claim 10, further comprising:
   performing the calibration without mechanical switching off or physically disconnecting the corresponding receiver antennas.

12. The method of claim 10, further comprising:
   selecting the respective pilot signal to be a continuous wave.

13. The method of claim 10, wherein the corresponding receiver antennas are each passive antennas.

14. The method of claim 10, wherein the signals originate from a remote transmitter, and further comprising:
   selecting a pilot bandwidth of the respective pilot signal, via the controller, such that the respective pilot signal is within a received bandwidth of the receiver and outside a transmit bandwidth of the remote transmitter.

15. The method of claim 10, wherein performing the calibration includes:
   determining a respective estimated signal for the plurality of receiving chains based in part on the respective chain phase values, the respective chain phase values being obtained with a predetermined estimator.

16. The method of claim 15, further comprising:
   obtaining the respective estimated signal of an mth chain of the plurality of receiving chains at time-step $t_k$ as:

$$s_m(t_k) = A_m e^{j(2\pi F1 t_k + \varphi_m)} + n_m(t_k), k = 0, \ldots, N-1;$$

and wherein $A_m$ is a signal amplitude of the mth chain, F1 is a center frequency of the respective pilot signal, $\varphi_m$ is a phase value of the mth chain, N is a number of time-steps and $n_m(t_k)$ is a noise function at the time-step $t_k$.

17. The method of claim 15, wherein performing the calibration includes:
   de-rotating the respective estimated signal with a rotation matrix, the rotation matrix being a function of a phase value $\varphi_1$ of the reference channel and a phase value $\varphi_m$ of the mth chain of the plurality of receiving chains.

18. The method of claim 17, further comprising:
   representing the rotation matrix for the mth chain as:

$$\begin{bmatrix} \cos(\varphi_1 - \varphi_m) & -\sin(\varphi_1 - \varphi_m) \\ \sin(\varphi_1 - \varphi_m) & \cos(\varphi_1 - \varphi_m) \end{bmatrix}.$$

19. An antenna array system comprising:
   a receiver having a plurality of receiving chains adapted to receive incoming signals from corresponding receiver antennas, each of the corresponding receiver antennas being a passive antenna;
   a respective directional coupler positioned in proximity to each of the plurality of receiving chains;
   wherein the plurality of receiving chains is adapted to receive a respective pilot signal through the respective directional coupler, the respective pilot signal being transmitted simultaneously, the respective pilot signal being a continuous wave;
   a controller having a processor and tangible, non-transitory memory on which instructions are recorded, the controller being adapted to select one of the plurality of receiving chains as a reference channel;
   wherein the controller is adapted to perform calibration for the receiver based on the respective pilot signal, including obtaining respective chain phase values and respective gain factors; and
   wherein the calibration is performed without mechanical switching off or physically disconnecting the corresponding receiver antennas.

* * * * *